United States Patent Office 2,954,712
Patented Oct. 4, 1960

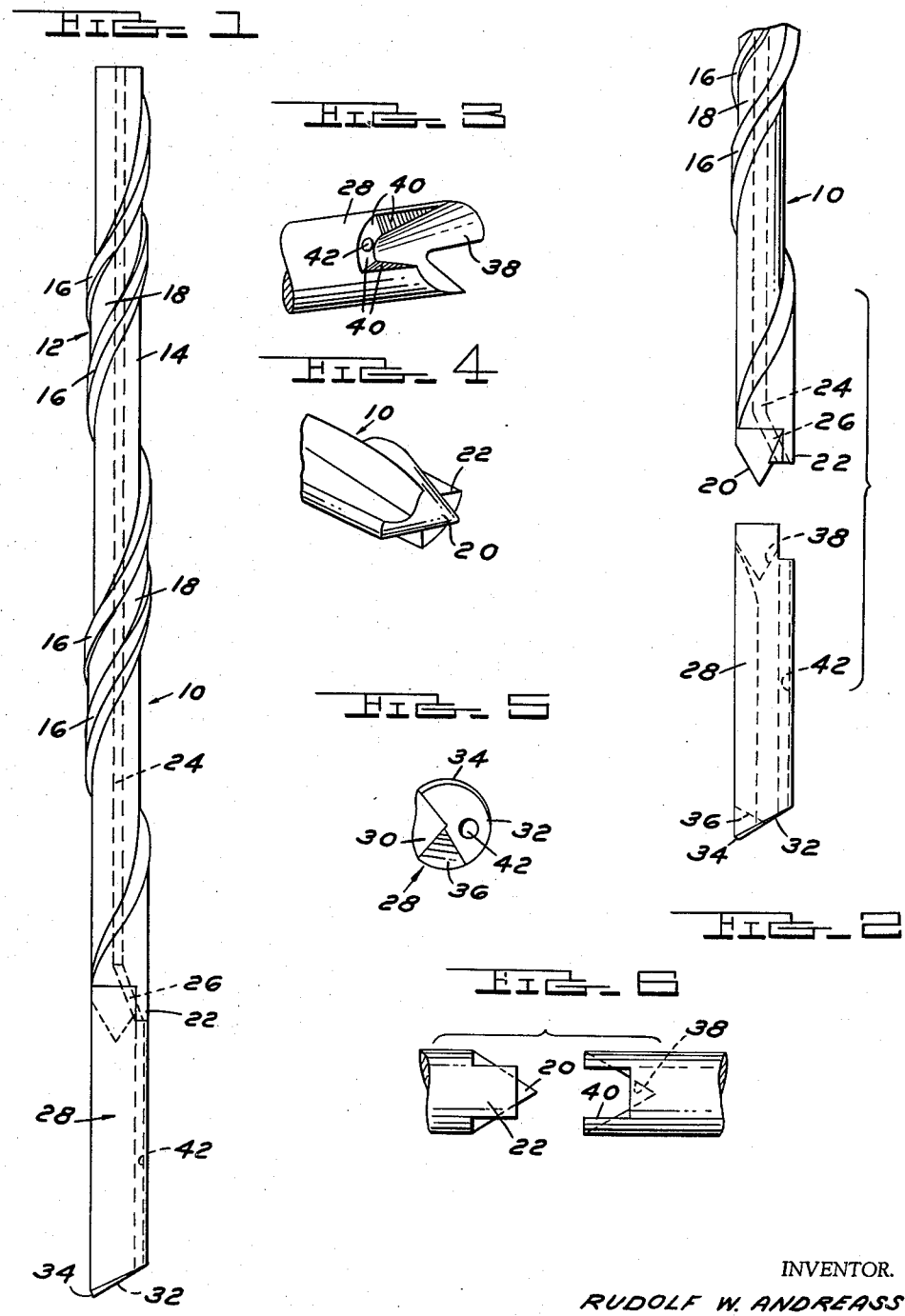

2,954,712
DEEP-HOLE DRILL

Rudolf W. Andreasson, 780 W. Maple Road, P.O. Box 174, Birmingham, Mich.

Filed Mar. 7, 1958, Ser. No. 719,930

3 Claims. (Cl. 77—68)

This invention relates to a deep-hole drill.

In recent years deep-hole drills have been referred to as gun drills and many of them have taken the form of a circular shaft with a segmental portion removed to permit free flow of coolant and chips. This type of drill, however, has been subject to the criticism that under torque loads it is apt to twist and into the noncircular cross section its twist may cause an uneven bending of the shaft leading to scoring of the sides of the shaft and other disadvantages.

It is an object of the present invention to improve on this gun drill construction by adding a shaft with a spiral flute with a wide spacing between the flutes and a relatively deep flute between the spiral lands to permit free flow of coolant and chips and still retain the even resistance to torque throughout the length of the drill.

Another object of the invention is to provide a spiraled drill shaft which is joined with a working end in a manner to assure accurate locating of one part relative to the other and also to make it possible to replace worn cutting ends with new cutting ends and still maintain straightness and axial concentricity.

Other objects and features of the invention will be apparent in the following description and claims.

Drawings accompany the invention and the various views thereof may be briefly described as:

Figure 1, a view of a drill assembly.

Figure 2, a view of the parts prior to assembly.

Figure 3, a view of the receiving end of the drill point.

Figure 4, a view of the pilot end of the drill shank.

Figure 5, an end view of the cutting end of the drill point.

Figure 6, an elevation of the joint between the mating parts of the drill shank and the drill end.

Referring to the drawings, the drill shank 10 has a single flute formed of a spiraled land 12 which is composed of a spiraled section on another otherwise cylindrical core part 14, the land 12 having two spaced surface ledges 16, spiraled by a sub-surface groove 18.

Drill shanks of this kind are usually provided with double lands so that the spiral grooves in between the lands are relatively narrow. The provision of a single land as described leaves a large flute area around the shank of the drill and consequently a large working area for the passage of chips and coolant. A relief groove 18 in the land 12 provides narrower bearing portions 16 for the walls of the hole and thus prevent development of heat and possible scoring which might otherwise result. The end of the shank 10 for receiving the hardened drill end is shown in Figure 4 as having a conical point portion 20 on one side of which is a segmental section 22 continuing down from the outer cylindrical diameter of the drill shank. The shank itself is centrally cored to provide a coolant passage 24 and this passage is angled off at 26 to terminate in the center of the segmental portion 22 (see Figs. 1 and 2).

Referring now to the cutting portion of the drill end 28, this is provided with a segmental relief groove 30 of substantially standard cross section for certain types of gun drills. One side of the cutting end is angled at 32 with a small relief arc 34, and another section on the other half of the drill is angled at 36. The shank end of the drill end 28 is provided with a recess shown in Figure 3 which is conical at surfaces 38 to receive the cone 20 of the shank end which is shaped as a segment of a cylinder at portions 40 to receive the segmental cylindrical portion 22 of the drill shank.

The drill end is provided with an off-center axial hole 42 to register with the passage 26 of the shank. The mating of these two ends is shown in Figure 2 and Figure 6. This would be accomplished by brazing the parts together while mounted in a V-shaped block which is conventional practice in the joining of cylindrical parts.

The conical portion 20 is received in the recess 38 so that the two parts are positively centered relative to each other at the joint. Radially, they are positively associated with the segmental cylindrical portion 22 entering the recess 40. This assures a positive drive connection between the two parts and also matches up the holes 42 and 26 for the continuous passage of fluid.

The drill ends are frequently ground during use and when one drill end is ground down to the point that it is reaching the scrap point, another drill end can be readily placed on the shank in the same manner as the original assembly.

Thus, with a modified spiral flute shank and a modified drill end there is a new combination which embodies the advantages of both the gun drill cutting end and the spiral shank together with the unusual joining sections which make it possible to unify these two parts.

What I claim is as follows:

1. A drill for the drilling of deep holes which comprises a shank and a drill end joined by a heating operation such as brazing, said shank comprising a cylindrical shank portion having a spiral land formed thereon with relatively wide spacing between the lands to provide a large coolant and chip area, the end of said shank terminating in a central conical projection having on one side thereof a cylindrical segment co-extensive with the conical projection from the base toward the apex, the radial walls of the cylindrical segmental portion merging into the conical walls of the conical projection, and a gun drill tip end on said shank having a cylindrical cross section with portions cut away for chip clearance, the end of said gun drill opposite the working end having a central conical recess complemental to the conical projection on the shank and having a side recess interrupting the walls of the gun drill providing axially and radially extending walls to complement the walls of the cylindrical segment on the shank portion, the cylindrical segmental portion on the shank portion abutting against the axial end of the side recess adjacent the conical opening in the gun drill.

2. A drill for the drilling of deep holes which comprises a shank and a drill end joined by a heating operation such as brazing, said shank comprising a cylindrical shank portion having a spiral land formed thereon with relatively wide spacing between the lands to provide a large coolant and chip area, the end of said shank terminating in a central conical projection having on one side thereof a cylindrical segment co-extensive with the conical projection from the base to about two-thirds of the altitude toward the apex, the radial walls of the cylindrical segmental portion merging into the conical walls of the conical projection, and a gun drill tip end on said shank having a cylindrical cross section with portions cut away for chip clearance, the end of said gun drill opposite the working end having a central conical recess complemental to the conical projection on the shank and having a side recess interrupting the walls of the gun drill providing axially and radially extending walls to complement the walls of the cylindrical segment on the shank portion, the cylindrical segmental portion on the shank portion abutting against the axial end of the side recess adjacent the conical opening in the gun drill.

3. A drill for the drilling of deep holes which comprises a shank and a drill end joined by a heating operation such as brazing, said shank comprising a cylindrical shank portion having a spiral land formed thereon with relatively wide spacing between the lands to provide a large coolant and chip area, the end of said shank terminating in a central conical projection having on one side thereof a cylindrical segment co-extensive with the conical projection from the base toward the apex, the radial walls of the cylindrical segmental portion merging into the conical walls of the conical projection, and a gun drill tip end on said shank having a cylindrical cross section with portions cut away for chip clearance, the end of said gun drill opposite the working end having a central conical recess complemental to the conical projection on the shank and having a side recess interrupting the walls of the gun drill providing axially and radially extending walls to complement the walls of the cylindrical segment on the shank portion, the cylindrical segmental portion on the shank portion abutting against the axial end of the side recess adjacent the conical opening in the gun drill, said shank and said gun drill each having a passage which registers at the abutting surfaces of the segmental portion on the shank and the end of the side recess of the gun drill to permit the continuous flow of coolant through the drill.

References Cited in the file of this patent

UNITED STATES PATENTS

| 321,144 | Soderstrom | June 30, 1885 |
| 2,325,535 | Nordberg | July 27, 1943 |
| 2,370,706 | Andreasson | Mar. 6, 1945 |